(12) United States Patent
Robbins

(10) Patent No.: US 9,103,708 B2
(45) Date of Patent: Aug. 11, 2015

(54) ADJUSTABLE MEASURING DEVICE

(71) Applicant: Fox Run USA, LLC, Ivyland, PA (US)

(72) Inventor: Rodney W. Robbins, Florence, AL (US)

(73) Assignee: FOX RUN USA, LLC, Ivyland, PA (US)

( * ) Notice: Subject to any disclaimer, the term of this patent is extended or adjusted under 35 U.S.C. 154(b) by 412 days.

(21) Appl. No.: 13/688,857

(22) Filed: Nov. 29, 2012

(65) Prior Publication Data

US 2014/0144228 A1 May 29, 2014

Related U.S. Application Data

(62) Division of application No. 12/592,662, filed on Dec. 1, 2009, now Pat. No. 8,336,377.

(51) Int. Cl.
| | | |
|---|---|---|
| *G01F 15/14* | (2006.01) | |
| *G01J 5/04* | (2006.01) | |
| *G01L 19/14* | (2006.01) | |
| *G01P 1/02* | (2006.01) | |
| *G01F 19/00* | (2006.01) | |
| *B29C 70/74* | (2006.01) | |

(52) U.S. Cl.
CPC ............ *G01F 19/002* (2013.01); *B29C 70/74* (2013.01)

(58) Field of Classification Search
CPC ............ G01F 15/14; G01J 5/04; G01L 19/14; G01P 1/02
USPC ........................................................ 73/432.1
See application file for complete search history.

(56) References Cited

U.S. PATENT DOCUMENTS

| | | | | |
|---|---|---|---|---|
| 3,416,375 A | * | 12/1968 | Lubman et al. | 73/429 |
| 5,182,948 A | * | 2/1993 | Robbins et al. | 73/429 |
| 5,325,717 A | * | 7/1994 | Robbins et al. | 73/429 |
| 5,460,042 A | * | 10/1995 | Tucker | 73/429 |
| D368,864 S | * | 4/1996 | Weterrings | D10/46.3 |
| D370,421 S | * | 6/1996 | Tucker | D10/46.3 |
| D371,976 S | * | 7/1996 | Tucker | D10/46.3 |
| D374,181 S | * | 10/1996 | Weterrings | D10/46.3 |
| D377,615 S | * | 1/1997 | Weterrings | D10/46.3 |
| 5,678,450 A | * | 10/1997 | Robbins et al. | 73/429 |
| D451,829 S | * | 12/2001 | McGuyer | D10/46.3 |
| D467,823 S | * | 12/2002 | McGuyer | D10/46.3 |
| 7,086,282 B2 | * | 8/2006 | Kilduff et al. | 73/429 |
| 7,503,212 B2 | * | 3/2009 | Dalla Piazza et al. | 73/429 |
| 2008/0205481 A1 | * | 8/2008 | Faries et al. | 374/138 |
| 2008/0216580 A1 | * | 9/2008 | Kuznia et al. | 73/714 |

* cited by examiner

*Primary Examiner* — Lisa Caputo
*Assistant Examiner* — Jamel Williams
(74) *Attorney, Agent, or Firm* — Archer & Greiner, P.C.; Jason F. Cotter; Gregory J. Winsky

(57) ABSTRACT

The moveable dam structure of an adjustable measuring device such as a spoon or scoop has a structure molded of a single material with thin flexible curved edges which fit into the internal walls of the housing to provide increased surface contact without co-molding or other assembly of a separate edge seal onto the moveable dam. The moveable dam is molded in a single step of a single thermoplastic material to give the dam a tapered cross-sectional shape with the inner portion thicker than the outer edges, with curved edges forming angles substantially different from 90° when bearing against the internal walls of the measuring container.

16 Claims, 3 Drawing Sheets

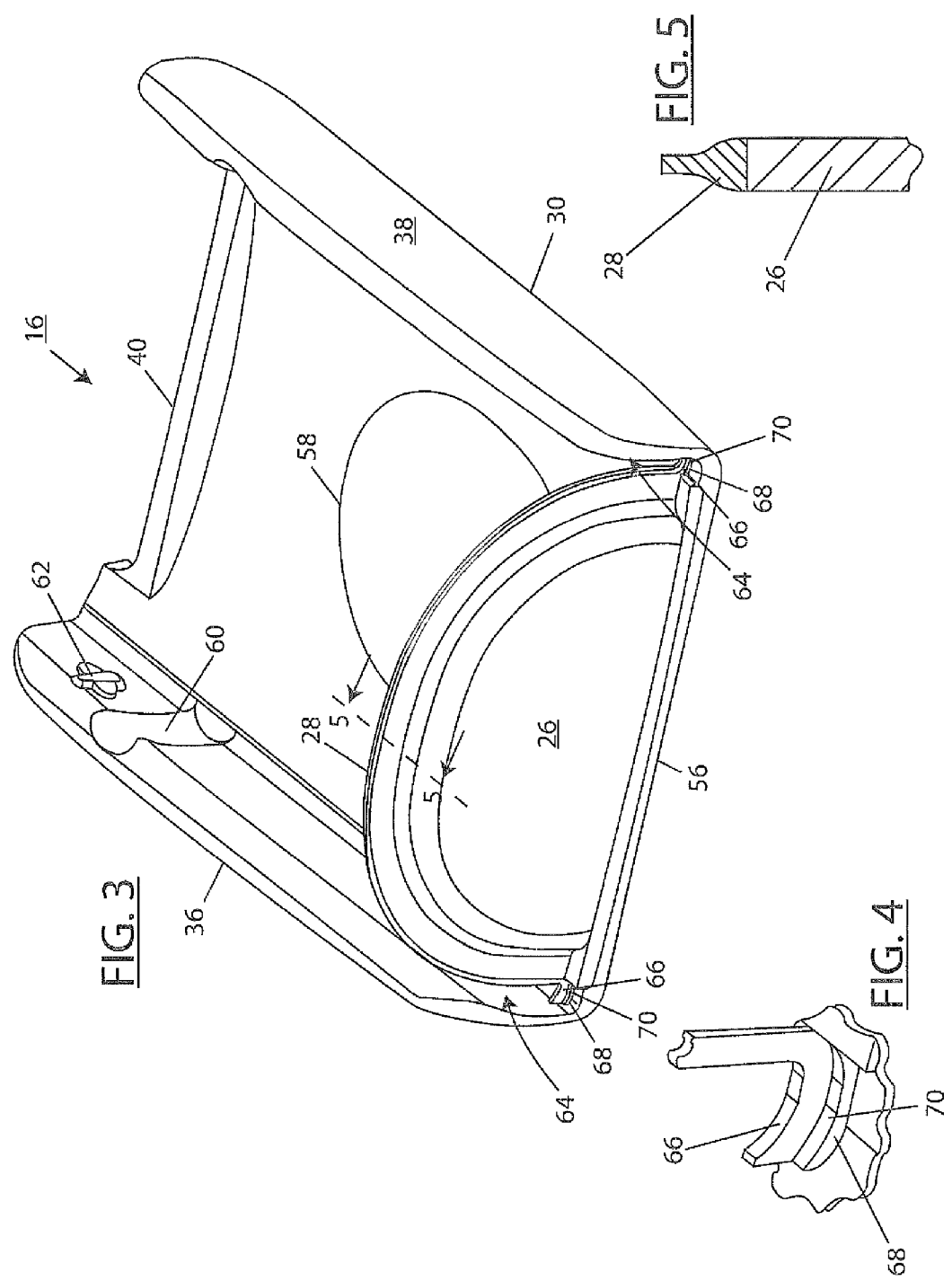

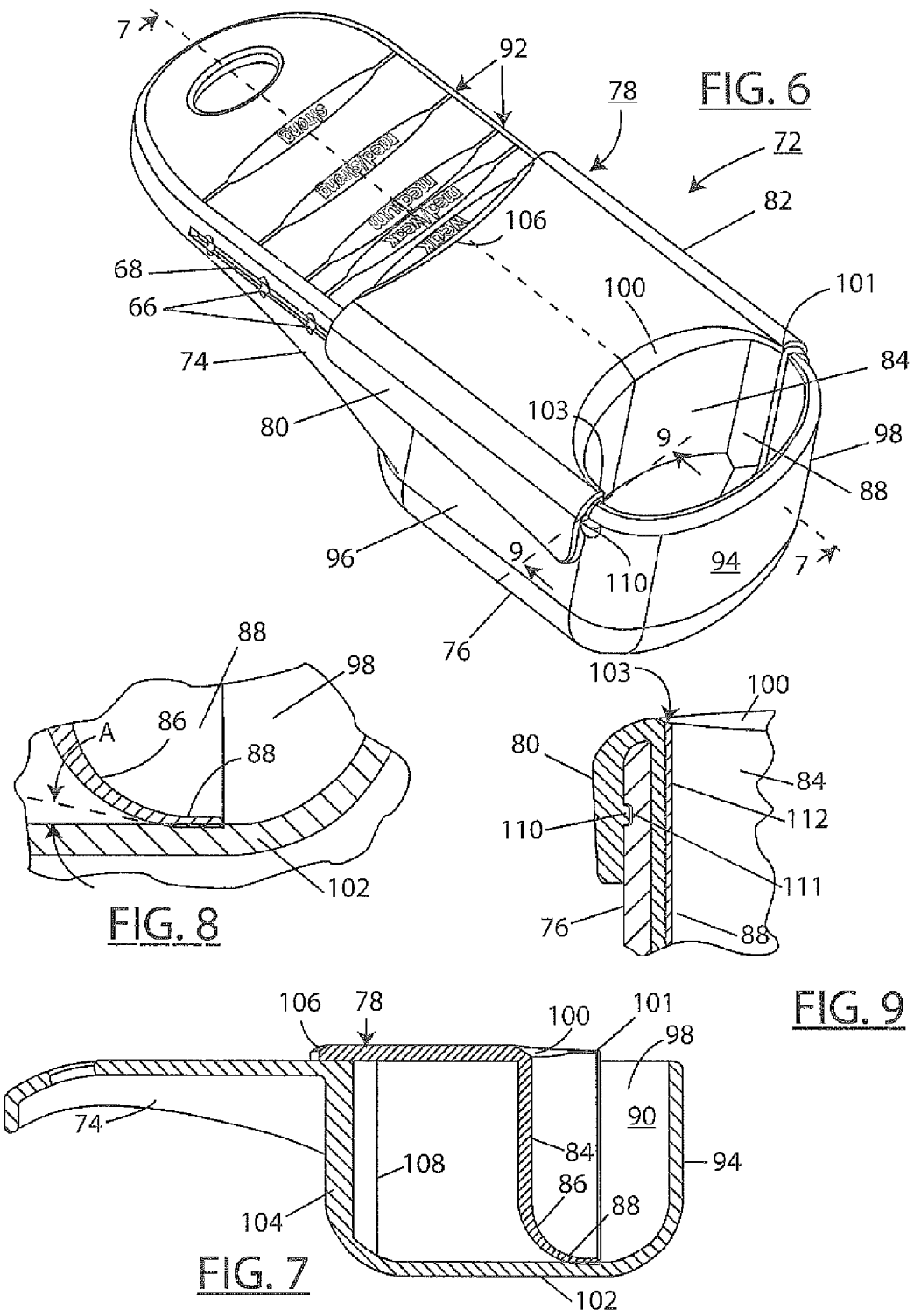

ADJUSTABLE MEASURING DEVICE

This patent application is a division of U.S. patent application Ser. No. 12/592,662 filed Dec. 1, 2009.

This invention relates to adjustable measuring devices such as adjustable measuring spoons and scoops.

Adjustable measuring spoons and scoops are well known and widely used. Adjustable spoons and scoops sold by the predecessor of the assignee of this patent application are shown, for example, in U.S. Pat. No. 5,182,948; U.S. Pat. No. D403,256 and U.S. Pat. No. D452,177, and others. Such prior devices are convenient to use to provide variable measurements of dry or liquid materials used in the kitchen.

When used to measure liquids, such adjustable devices often use flexible sealing members along the edges of slidable dam members to prevent leakage of the liquids past the dam members. Despite the utility and convenience of such prior devices, there are still problems with them which need solution.

Manufacturing cost is always a problem, since such devices need to be of moderate or low cost to be competitive in the marketplace.

Another problem is that prior sealing members have been found to leak under certain circumstances, and particularly when measuring low viscosity fluids such as those containing alcohol.

Accordingly, it is an object of the invention to provide improved adjustable measuring devices which alleviate or resolve the above-identified problems.

In particular, it is an object of the invention to provide an adjustable measuring device which will measure any and all liquids with minimal or no leakage.

It is a further object of the invention to provide such a device which is less costly to manufacture.

In accordance with the present invention, it has been discovered that prior adjustable measuring spoons and scoops sometimes leak in the spaces at the uppermost intersections between the movable sliding dam structure and the flanges which allow the cover of the device to be snapped on and snapped off for easy cleaning. Accordingly, a sliding dam is provided with a molded outer rubber-like sealing edge, and the edge is extended upwardly into the space between the side flanges and the slider dam member, and the sealing member is anchored to the cover structure to hold it in place.

In an alternative embodiment of the invention, the sliding dam member is made with a semi-bowl shape having curved edges which bear against the internal walls of the bowl of the measuring device at a low angle. Preferably, the angle is less than 45°. More preferably, the angle is approximately 9° to 16°, and most preferably is about 13°. Also, the material of the dam member at those curved edges is tapered to a reduced thickness so as to make it very flexible and the dam member is dimensioned to form an interfering fit when inserted into the bowl. This urges the flexible edges of the slidable dam member against the bowl's internal sidewalls to provide a good seal. This dam member advantageously comprises a single molded part which is substantially less expensive to manufacture than a dam member with a seal co-molded to its outer edge. Leakage at the intersections of the dam member and the sidewalls is avoided by the extended contact area of the slider with the sidewalls, and by filling the space between the slider and the sidewalls with the slider structure.

The foregoing and other objects and advantages will be set forth in and apparent from the following description and drawings.

IN THE DRAWINGS

FIG. 3 is an enlarged perspective view of the underside and front portion of the slider member and cover of the device shown in FIG. 1;

FIG. 4 is a further enlarged perspective view of a portion of the structure shown in FIG. 3;

FIG. 5 is a cross-sectional, partially broken away view of a portion of the structure shown in FIG. 4;

FIG. 6 is a perspective view of an alternative embodiment of the adjustable measurement device of the present invention;

FIG. 7 is a cross-sectional view taken along line 7-7 of FIG. 6;

FIG. 8 is an enlarged, broken away detailed view of a portion of the structure in FIG. 7; and FIG. 9 is a broken away cross-sectional view taken along line 9-9 of FIG. 8.

GENERAL DESCRIPTION

The adjustable measuring device 10 shown in FIGS. 1 through 5 is an adjustable measuring spoon. The adjustable measuring device 72 shown in FIGS. 6 through 9 is an adjustable measuring scoop, which is larger than the spoon. It should be understood that the construction of either embodiment of the invention is readily usable in either a spoon or a scoop simply by scaling the structure up or down, as needed.

FIGS. 1-5 Embodiment

Figure 1:
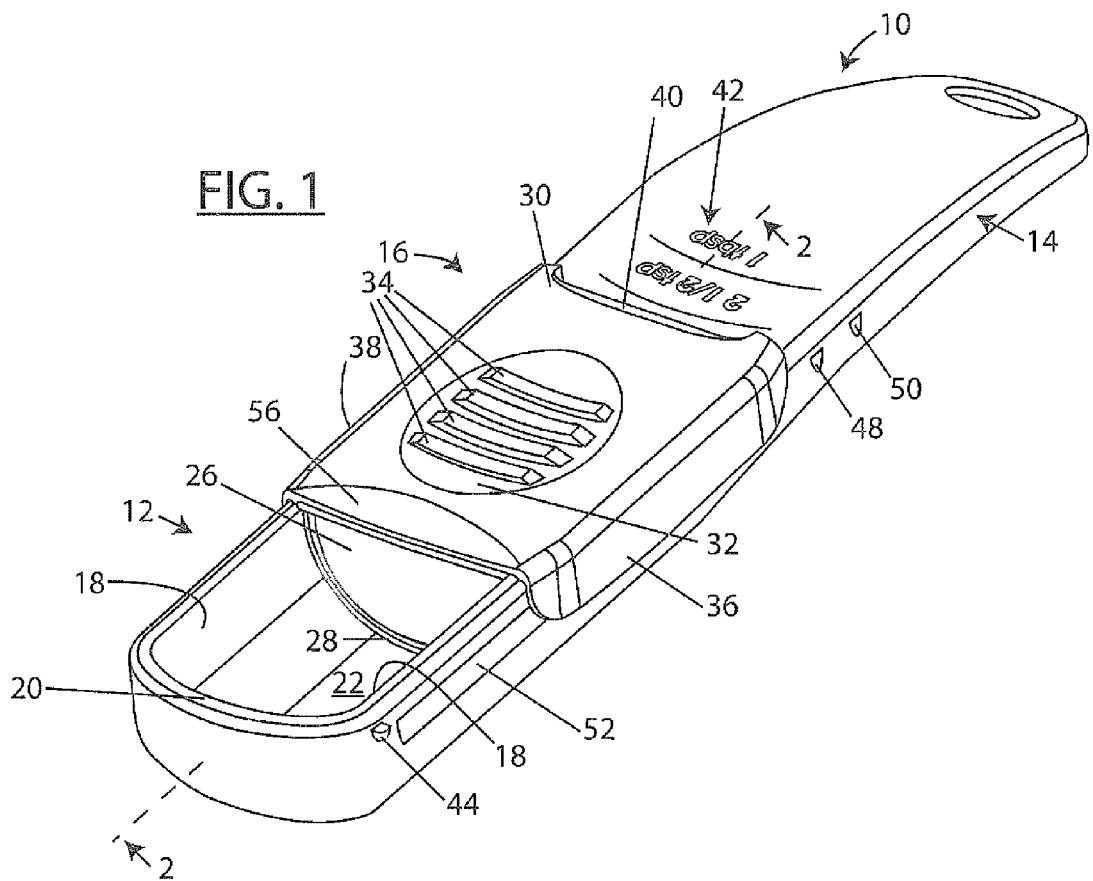
FIG. 1 is a perspective view of an adjustable measuring spoon constructed in accordance with the invention.

Referring first to FIG. 1 of the drawings, the adjustable spoon 10 includes a base structure having an elongated bowl 12 and a handle 14 which is integral with the bowl 12. The bowl 12 includes sidewalls 18, a front end-wall 20, and a rear-wall 24 (see FIG. 2). A slider 16 is mounted to cover a portion of the bowl and handle, and is dimensioned so that it covers the bowl portion behind the slider when it is in its forward-most position. The slider has a dam structure 26 with a sealing member 28 on its outer edge. The dam structure 26 fits into the bowl 12 and is contoured to slide within the bowl with the sealing member 28 in intimate contact with the internal sidewalls of the bowl.

The slider 16 is mounted to slide longitudinally with respect to the body of the spoon along side rails such as the rail 52 shown in FIG. 1 by side flanges 36 and 38 which snap onto the side rails to allow the sliding dam member 26 to move to different positions within the bowl 12 to provide an adjustable measurement volume. The slider has a beveled frontal area 56.

Measurement indicia 42 are printed on the top of the handle portion 14, and the slider 16 is dimensioned so that its rear edge 40 comes into alignment with different ones of the indicia 42 to thereby indicate the approximate volume of the space in the bowl defined by the position of the dam member 26.

The cover of the slider 16 has a central recessed area 32 with a plurality of upstanding cleats 34, which provide a gripping means for a finger or thumb when it is used to slide the slider member. The bottom wall 58 of the recess 32 is shown in FIGS. 2 and 3.

Figure 2:
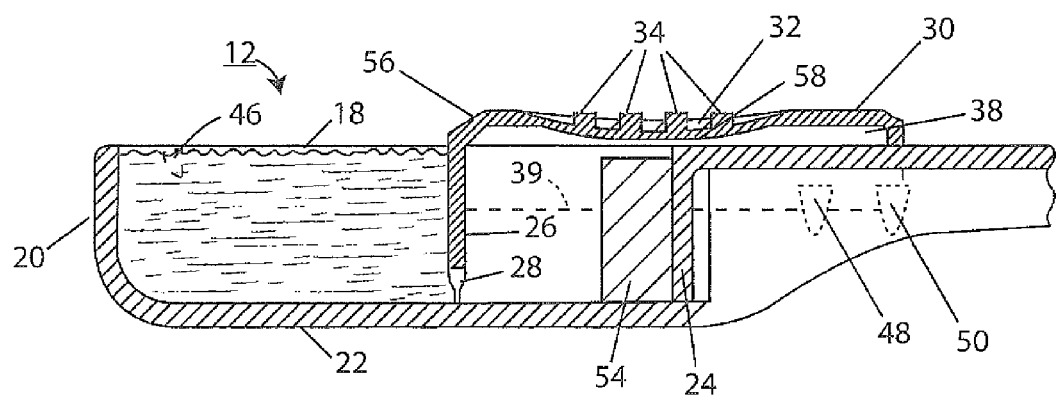
FIG. 2 is a an enlarged cross sectional, partially broken away view of the device shown in FIG. 1.

Referring to FIG. 2 as well as FIG. 1, the forward progress of the slider in its longitudinal movement is stopped by a pair of stop members 44 and 46. The rear-most position of the sliding dam member is defined by a stop member 54 (FIG. 2) which extends from the surface of the rear-wall 24 and limits the rearward movement of the dam member 26.

A plurality of vertical notches such as notches 48 and 50 shown in FIG. 2 are provided on the outsides of the handle structure to form detent positions at which the rear edge 40 of the slider will be aligned with one of the measurement lines 42 printed on the top of the handle.

FIG. 3 of the drawings is an enlarged view of the underside of the slider 16. As shown in FIG. 3, the detent structure also includes grooves or cut-outs 60 on the insides of both flanges 38 and 36, and includes a pair of projections 62, only one of which is visible. The grooves 60 reduce the thickness of the flange to make it more flexible and the projections 62 fit into the grooves 48 and 50 to stop the slider's movements so that the rear edge 40 of the slider is aligned with one of the measurement indicia 42 (FIG. 1).

Still referring to FIG. 3, the peripheral sealing member 28 is made of flexible, rubber-like material called "TPR" (thermoplastic rubber) and is secured to the edges of the dam member 26 by the known process of "co-molding". This forms a secure connection between the sealing member 28 and the dam member 26. The sealing member 28 is tapered, as shown in FIG. 5, and is flexible like a windshield-wiper blade.

The sealing member 28 has been provided on devices supplied to the public in the past. However, applicant has discovered that such a sealing arrangement, although usually satisfactory, sometimes has leaked, especially when liquids are placed in the bowl for measurement and left for a certain period of time before being dispensed. This phenomenon was especially common when the liquids being measured were of low viscosity and contained alcohol, such as vanilla or lemon extract, etc. The source of this leakage was unknown for a long time, and it was difficult to find, despite continued study of the problem. Applicant has discovered that, apparently, the liquid "wicks" upwardly in the corners of the dam structure where the space is formed between the sliding dam member 26 and the outside flanges 36 and 38; that is, in the spaces 64.

Therefore, in accordance with this discovery and in accordance with the present invention, the sealing member 28 is extended downwardly and sideways in the spaces 64, as shown at the left side of FIG. 3 and in FIG. 4, so that an L-shaped segment 66 of the sealing member 28 with an enlarged foot portion 70 is secured in a recess 68 in the material of the cover so as the seal the top edges of the bowl against the cover. This provides a seal to prevent the wicking of the liquid and resulting leakage.

FIGS. 6-9 Embodiment

As noted above, FIG. 6 shows an adjustable measuring scoop 72 constructed in accordance with the invention. The scoop 72 has a slider 78, and a handle 74. The handle is specifically marked with indicia 92 which indicate the relative strength of coffee made with an amount of ground coffee corresponding to the location of the rear edge 106 of the slider at one of the indicia. That is, for example, when the rear edge 102 of the slider 78 is aligned with the "WEAK" position, percolated coffee using the amount of coffee in the scoop will be relatively weak. The other indicia are marked with differing degrees of strength of the resulting coffee, with the largest volume measurement corresponding to "STRONG" coffee. Of course, the handle markings 92 can indicate volume measurements (e.g., "one cup," "½ cup," etc.)

The scoop 72, or a spoon made with the same construction, is capable of measuring liquids without leakage because of a sliding dam 84 construction which provides good sealing without the use of a co-molded sealing member at the edges of the sliding dam member 84.

The body of the scoop 72 has a bowl 76 integral with a handle 74. The bowl has sidewalls 96 and 98, a front wall 94 and a bottom wall 102 (see FIG. 7). The bowl 76 also has a rear wall 104 with a central projection 106 which serves as the rear stop member for the slider 78. The slider 78 has a beveled area 100 at the junction between the vertical dam portion 84 and the horizontal cover portion.

In accordance with one of the features of the invention, the sliding dam member 84 is semi bowl-shaped; the bowl has rounded outer portions 86 and a tapered, relatively thin edges 88 which make intimate contact with the internal sidewalls and bottom of the bowl to provide a sealed area which is capable of holding liquids without any substantial leakage.

The sliding cover member 72 has side flanges 80 and 82 which fit over the upper edges of the bowl and the sides of the handle 74. Each flange 80, 82 has an internal longitudinal spline or ridge 110 (FIGS. 6 and 9) which fits into a groove 111 in the outer surface of the sidewall 96 or 98 to serve to hold the slider onto the bowl and provide a track on which the slider moves. Like the sliding dam structure of the spoon shown in FIGS. 1 through 5, the cover or slider 78 can be snapped on and snapped off of the scoop body so as to be separable for easy cleaning.

FIG. 8 is an enlarged, broken away view of the edge 88 and curved portion 86 of the sliding dam member 84. It can be seen that the lower edge 88 is tapered and is considerably thinner in cross section than the rest of the dam member 84.

FIG. 9 shows the cross-section 112 of the outer edge 88 and how the edge 88 forms a seal with the inner surface of a sidewall of the bowl 76.

The outer edges 88 of the dam structure contact the inner walls of the bowl at a small or low angle "A". This greatly increases the flexibility of the edges 88. The dam member 84 is dimensioned so that it will fit in the bowl 76 with a slight interference fit to urge the flexible edges 88 against the bowl walls and provide a good seal. The low angle "A" assures that the areas of contact of the edges 88 with the internal walls of the bowl is relatively large so as to assure the formation of good seals. The engagement of the flanges 80, 82 with the splines 110 should be firm enough to resist the tendency of the interference fir to separate the slider from the bowl.

As it is evident from FIGS. 6 and 9, the edges 88 of the dam member 84 extend upwardly to the junction points 101 and 103 so as to provide a seal all the way up to the top edge of the bowl 76 to minimize the chances of leakage. Thus, the vulnerable area for leakage is effectively sealed by the embodiment shown in FIGS. 6 through 9 without a co-molded sealing member. This saves considerably in the cost of manufacturing the device. It is believed that the structure at the junction points will minimize any tendencies for liquids to be wicked upwardly.

Preferably, the materials of which the sliding dam member 84 are made have relatively low viscosity when liquid, and thus are relatively easy to mold into thin cross-sections such as the edges 88. Preferred materials for this purpose are nylon 6 or nylon 66 and high density polypropylene. Each of these materials flows readily when liquid and has a high degree of flexibility when solid. In addition, each of these materials has a high degree of lubricity, thus helping to assure that the slider 78 slides relatively easily.

Although it is not shown, a detent structure like that in the FIGS. 1-5 embodiment also is provided in the adjustable scoop 72.

Preferably, angle "A" shown in FIG. 8 is considerably less than 45° and varies from a low of about 9° to a high of about 16°. The preferred angle is about 13°. These ranges of angles provide the best combination of flexibility and sealing qualities. If angle "A" is too large, there will be insufficient contact area for the edge 88, and if "A" is too small, there may be too much drag which may overly impede movement of the slider.

The thickness of the material at the edges 88 preferably is around ½ millimeter.

Although the seal may not need to be as tight when measuring dry materials as when measuring liquids, it is preferred to make all of the measuring devices with liquid-tight seals regardless of whether they are intended to measure liquids, because a homeowner may decide to use the device in a way that it was not intended to be used and that person should not be disappointed. Moreover, using a standardized construction for all devices can lead to manufacturing cost savings.

It can be seen from the foregoing that the objectives of the invention have been fully met by the embodiments shown and described above.

The above description of the invention is intended to be illustrative and not limiting. Various changes or modifications in the embodiments described may occur to those skilled in the art. These can be made without departing from the spirit or scope of the invention.

The invention claimed is:

1. An adjustable measuring device, comprising
   a. a body member comprising a housing with a handle, said housing having a wall structure with an inner surface having a curved cross-sectional shape,
   b. a dam member movably mounted on said body member and having a planar body with curved edges shaped to match said curved cross-sectional shape and form a dam to define an open-top measuring container having a volume variable by positioning said dam in said housing,
   c. an actuating structure engaged with said dam member and manually operable to move said dam in said housing to change said volume,
   d. said dam member having an integral outer portion bent to form a seal with said inner surface of said housing when said dam member is thrust against said inner surface, said outer portion being flexible and bearing against said inner surface at an angle substantially different from 90°.

2. The device as in claim 1 in which said angle is substantially less than 45°.

3. The device as in claim 1 in which said angle is from approximately 9° to approximately 16°.

4. The device as in claim 1 in which the cross sectional shape of said integral dam member is tapered so that the thickness of said dam member is greater inwardly from said outer portion than at said outer portion.

5. The device as in claim 1 in which said housing wall structure includes two side walls and a bottom wall, and said integral outer portion of said dam member contacts said side walls and said bottom wall to form a semi-bowl-shaped structure.

6. The device as in claim 1 in which said dam member has a gradually tapered cross-sectional shape with an inner portion and a relatively thinner outer portion bent to form said angle when bearing against said inner surface with an interference fit.

7. The device as in claim 1 in which said wall structure forms a trough with at least one end wall, a bottom wall, and two side walls, the position of said dam along said trough defining the volume of said container.

8. The device as in claim 6 in which said inner portion of said dam member forms an angle of approximately 90° with said wall structure of said housing.

9. The device as in claim 7 in which said trough is elongated and linear, and said actuating structure comprises a cover over a part of the top of said housing not in use for measuring, said dam member is mounted to said cover, said actuating structure being secured to slidably move on said housing to releasably hold said cover onto said housing and hold said dam member against said inner surface of said housing.

10. The method of making a movable dam member for an adjustable measuring device, said dam member having a generally planar shape with edges shaped to fit into a housing and form a movable dam therein with a sealing edge to mate with the internal walls of said housing at a variety of different positions and thereby change the measuring volume of said measuring device, said method comprising forming said dam member from a single flexible thermoplastic material in a mold giving said dam member a generally planar shape and an inner portion of a first thickness and a cross-sectional shape which tapers outwardly to an outer portion to give said outer portion a second thickness substantially less than said first thickness, and said outer portion being bent so as to form an angle substantially different from 90° when said dam member is positioned in dam-forming position in said housing.

11. The method as in claim 10 in which said angle is less than 45°.

12. The method as in claim 10 in which said angle is between approximately 9° and approximately 16°.

13. The method as in claim 10 in which said material is a liquid of viscosity low enough to permit free flow into the thinnest cavity areas of said mold, at molding temperature, and which is flexible when hard.

14. The method as in claim 13 in which said material is selected from the group consisting of nylon and high density polypropylene.

15. A method of making an adjustable measuring device comprising
   a. forming a housing and handle for said device, said housing having a shape to form a variable measuring container when assembled with a movable dam member,
   b. forming a movable dam member as recited in claim 10, and
   c. movably mounting said dam member in said housing with the outer portion thereof in contact with and forming an interference fit with the internal walls of said housing.

16. The method as in claim 15 in which said angle between said internal walls and said outer portion of said dam member is between approximately 9° and approximately 16°.

* * * * *